N. J. CONRAD.
METHOD OF AND MEANS FOR SWITCHING.
APPLICATION FILED SEPT. 24, 1917.

1,393,344.

Patented Oct. 11, 1921.

Inventor
Nicholas J. Conrad
By Brown Hanson & Bottcher
Attorneys

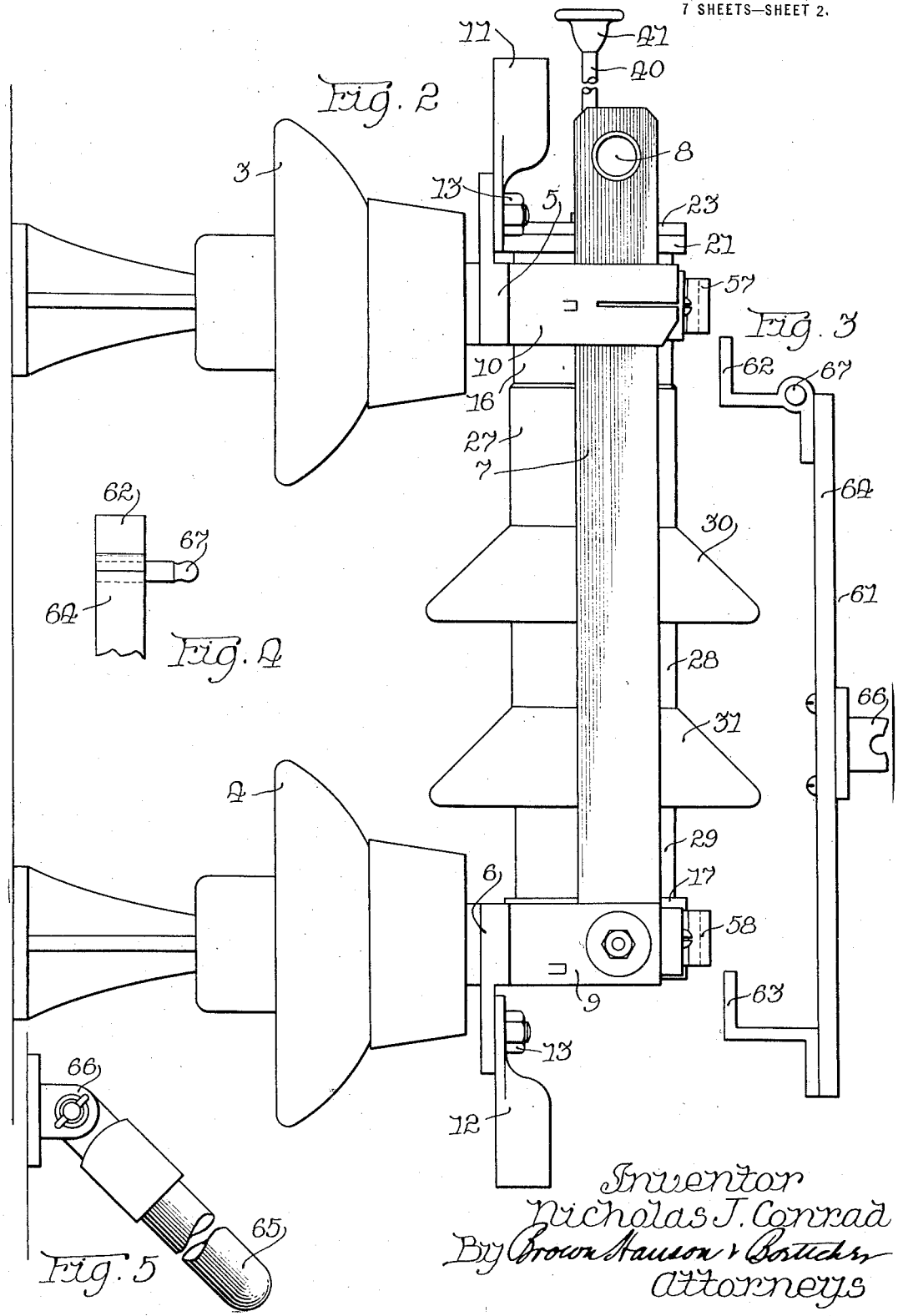

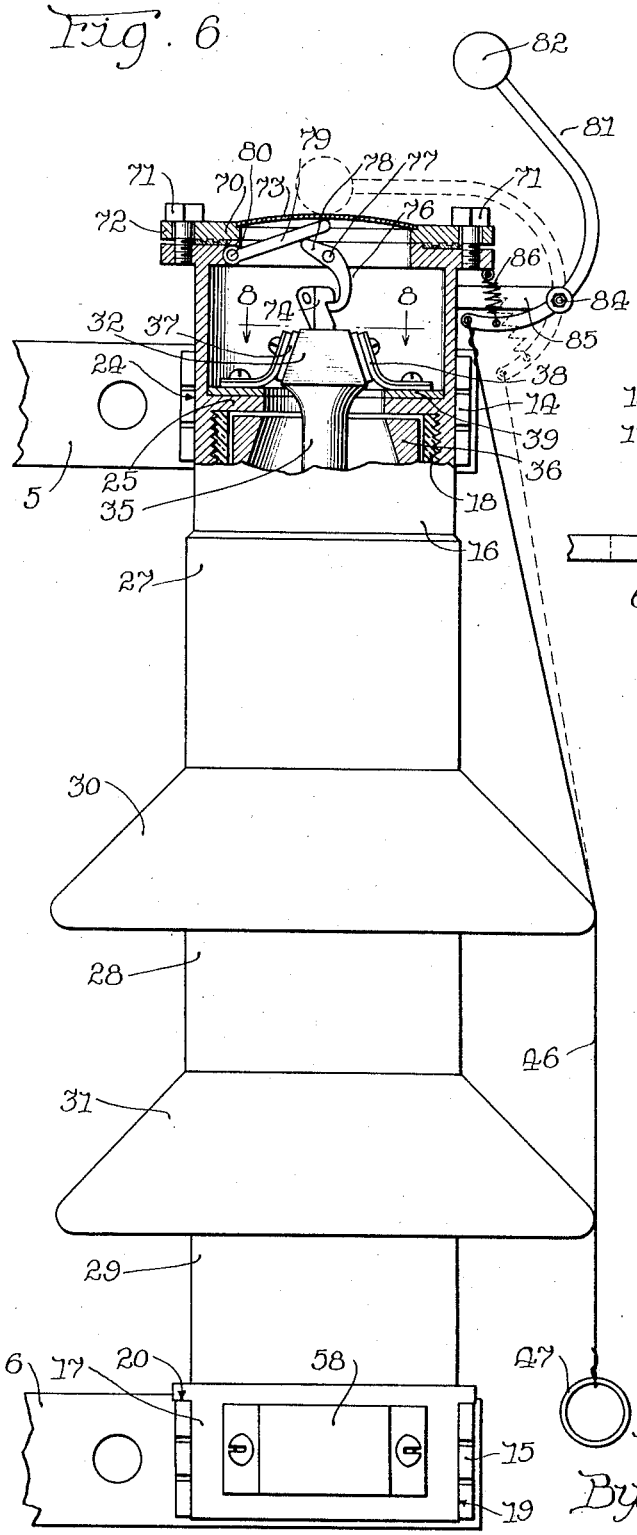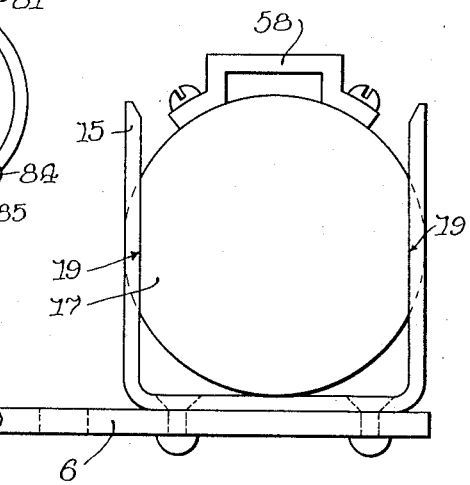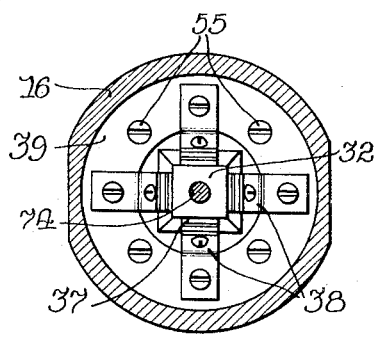

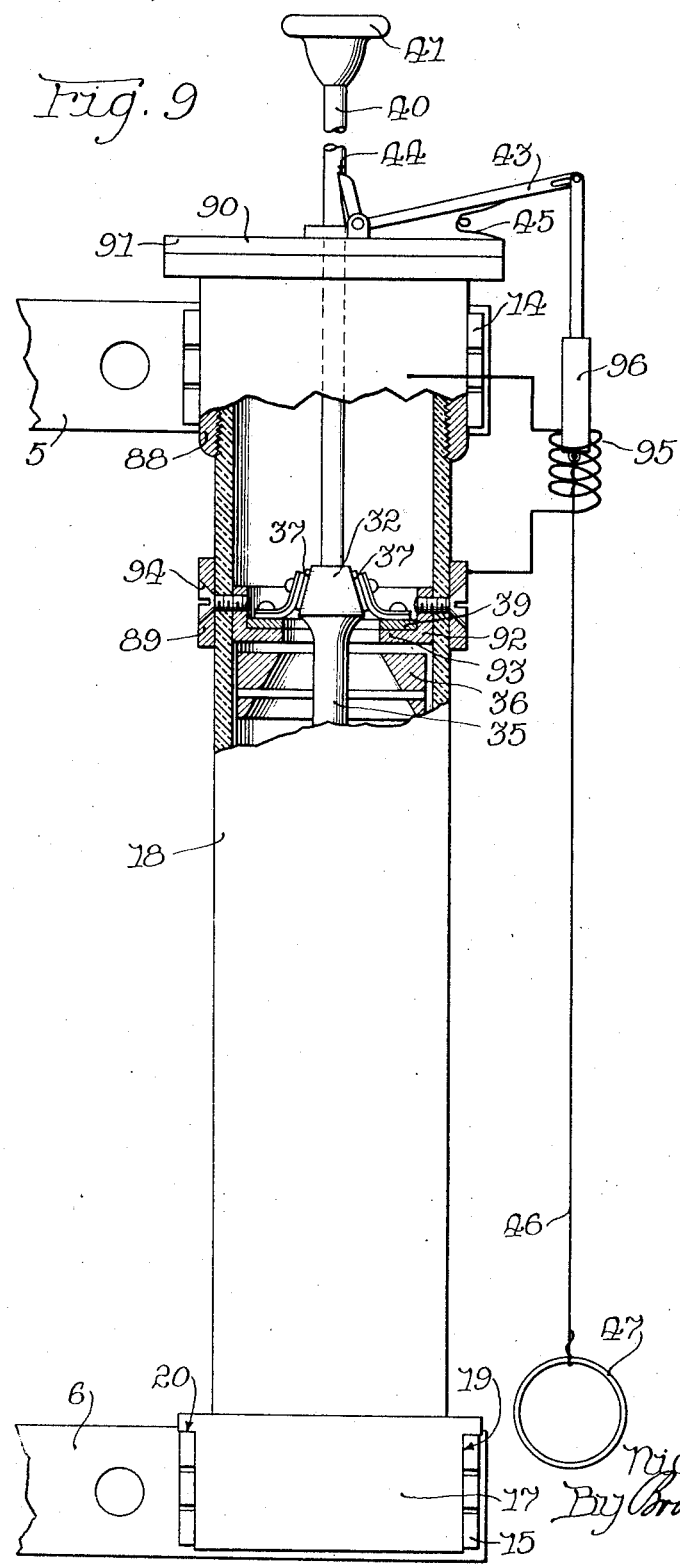

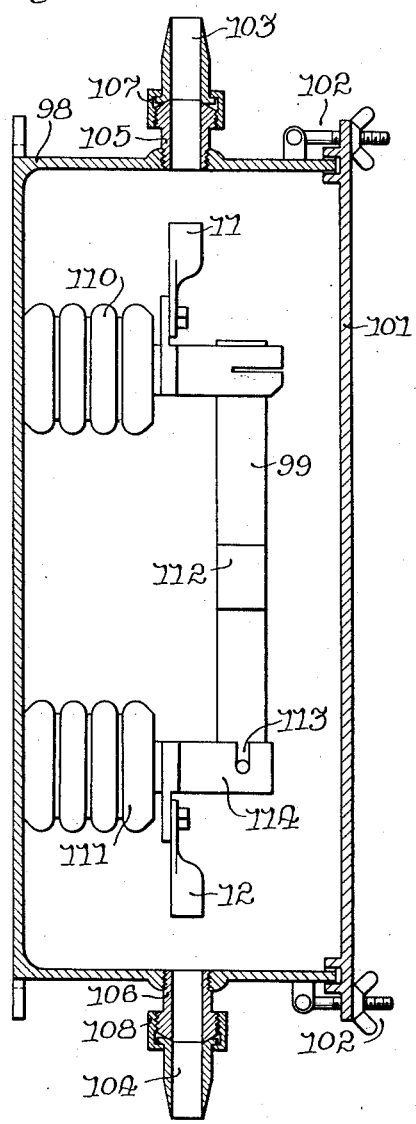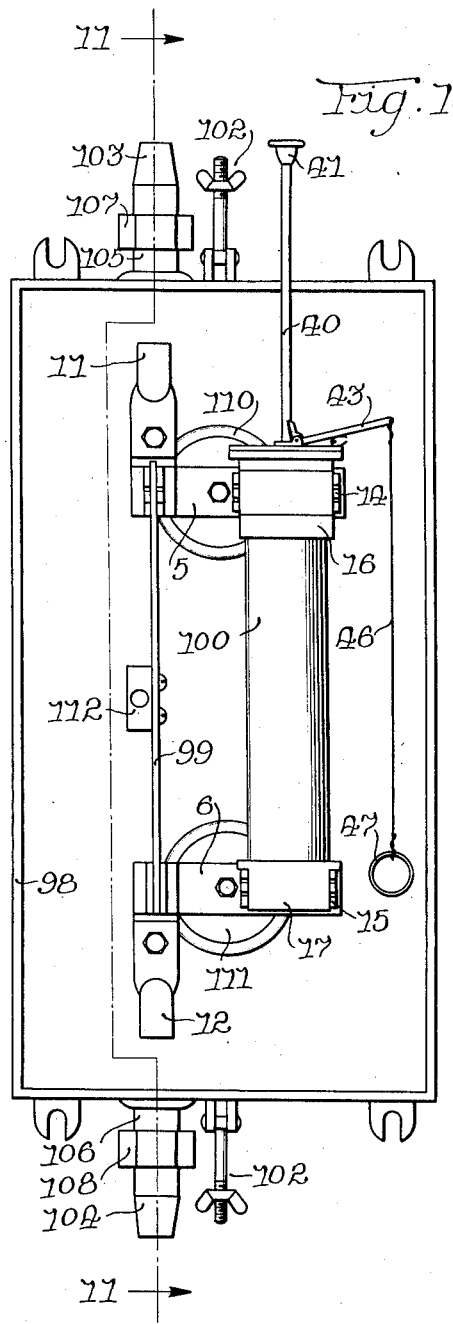

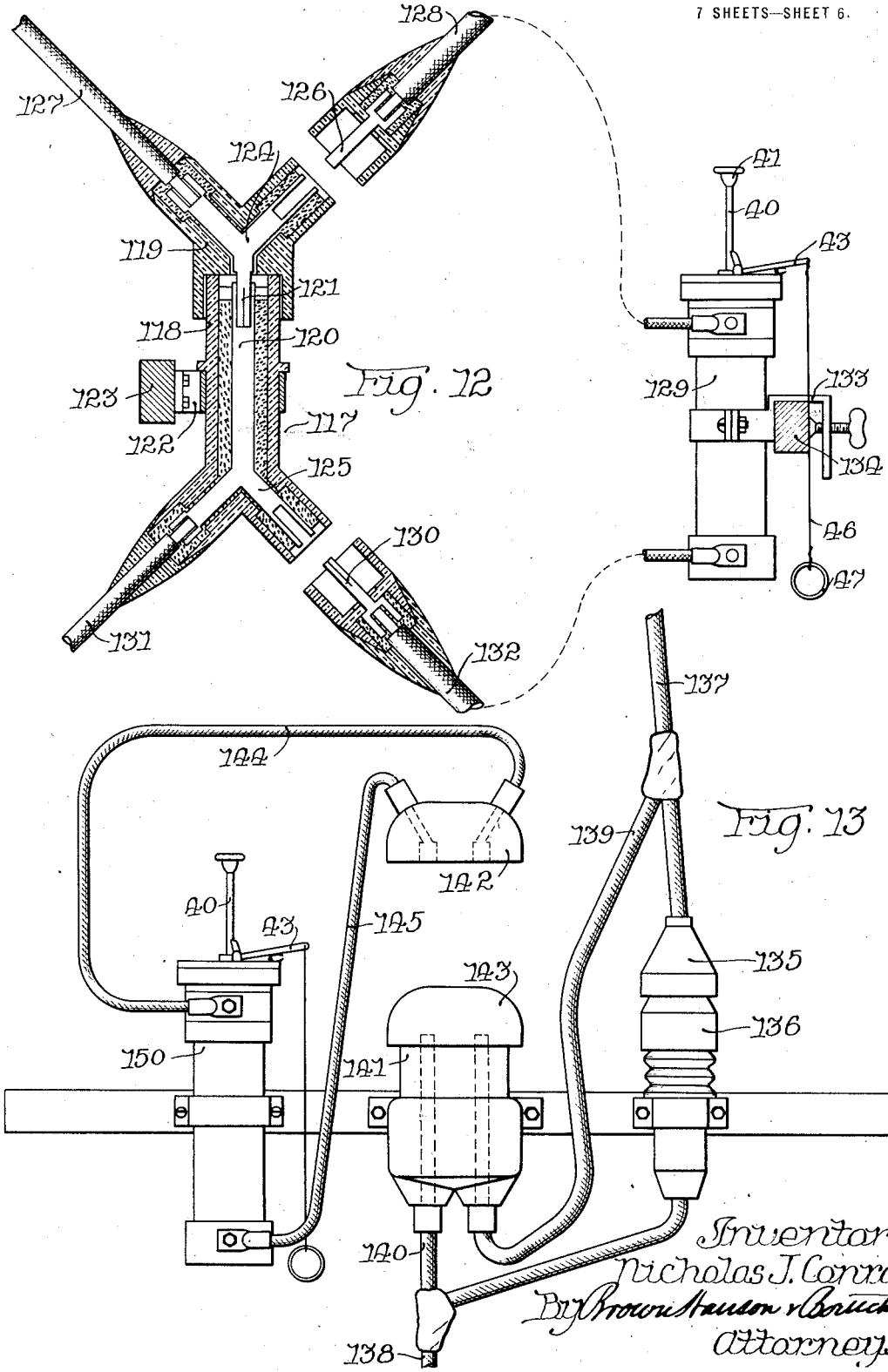

N. J. CONRAD.
METHOD OF AND MEANS FOR SWITCHING.
APPLICATION FILED SEPT. 24, 1917.

1,393,344.

Patented Oct. 11, 1921.
7 SHEETS—SHEET 7.

Inventor
Nicholas J. Conrad
By Brown, Hanson & Boettcher
Attorneys.

UNITED STATES PATENT OFFICE.

NICHOLAS J. CONRAD, OF CHICAGO, ILLINOIS, ASSIGNOR TO SCHWEITZER & CONRAD, OF CHICAGO, ILLINOIS, A CORPORATION OF ILLINOIS.

METHOD OF AND MEANS FOR SWITCHING.

1,393,344.     Specification of Letters Patent.     Patented Oct. 11, 1921.

Application filed September 24, 1917. Serial No. 192,870.

*To all whom it may concern:*

Be it known that I, NICHOLAS J. CONRAD, a citizen of the United States, residing at Chicago, in the county of Cook and State of Illinois, have invented a certain new and useful Improvement in Methods of and Means for Switching, of which the following is a full, clear, concise, and exact description, reference being had to the accompanying drawings, forming a part of this specification.

My invention relates to method of and means for switching.

Heretofore in the art whenever it has been desired to provide a line with means for breaking the circuit an oil switch has been considered to be the only solution on transmission lines carrying a voltage of 2,000 volts and upward.

With increases of the voltage running up to between 10,000 and 50,000 volts or more the oil switches become almost as large as the transformers and are very expensive to construct and maintain in operation.

Even on moderately high voltages of 10,000 volts and under the oil switches required for disconnecting a line or piece of high tension apparatus are so large and complicated that the expense is almost prohibitive. The practice therefore has grown up in many cases to eliminate oil switches where some scheme for disconnecting is actually necessary and to rely in those instances upon air disconnect switches.

Air disconnect switches, as is well known by those skilled in the art, are very unsatisfactory and are practically worthless for disconnecting a line which is under a heavy load or overload.

I have found that on account of the cost and difficulty of maintaining oil switches, many lines are without adequate means for disconnecting a loaded line.

According to my invention I provide a switching element which is portable and which is carried to the point where the line is to be disconnected and there performs its work, being employed in the nature of a tool for a specific purpose, namely to break the current flowing in a line.

This method of procedure is, so far as I am aware, novel and constitutes one broad aspect of my invention set out in the following detailed specification and claims as a novel method of switching.

The means which I employ consists of an improvement upon the switching unit shown and described in my copending applications Serial No. 151,068, and Serial No. 158,815 although it is to be understood that the broad aspect of my invention is not limited to this nor any other specific means.

In order to acquaint those skilled in the art with the manner of constructing and practising my invention, I shall now describe in detail a specific embodiment of the invention and the novel manner of use of the same in connection with the accompanying drawings which form a part of the present specification.

Figure 1 of the drawings illustrates a front elevation with parts broken away to reveal the interior construction of one form of my invention;

Fig. 2 illustrates a left side elevation of the device shown in Fig. 1;

Fig. 3 illustrates a side elevation of the operating tool or fork for manipulating the switching unit and the disconnect switch;

Fig. 4 is a front elevation of the top of the operating fork showing the pin for opening the disconnecting switch;

Fig. 5 illustrates the adjustable connection between the end of the fork and the handle;

Fig. 6 is a front elevation with a part in section showing the switching unit with a different type of closure and a different type of tripping means;

Fig. 7 is a bottom plan view of the device shown in Fig. 6;

Fig. 8 is a section of the device shown in Fig. 6 taken on the line 8, 8 of that figure;

Fig. 9 is a front elevation of a device embodying the invention showing a part in section and showing a relay mounted upon the switching unit for automatically tripping the switch;

Fig. 10 is a front elevation of a cable-box with the cover removed showing the manner of employing the device of my invention in connection with lead covered cables;

Fig. 11 is a section taken on the line 11, 11 of Fig. 10;

Fig. 12 shows in section a disconnecting pothead adapted to be employed in connection with my invention in which the disconnecting pothead is employed instead of the disconnecting switch;

Fig. 13 is an elevation of the switching unit and terminals adapted to coöperate with another form of disconnecting pothead.

In carrying out my invention I provide in the line to be disconnected a switch of relatively small energy interrupting capacity which is permanently connected to the line in normally closed position. In parallel with this switch of relatively small energy interrupting capacity I connect for the purpose of carrying out my invention a portable switch of relatively large carrying capacity and large energy interrupting capacity so that the current is then divided between these two switches. I then open the switch of relatively small energy interrupting capacity leaving the other switch closed until all of the energy normally carried by the first switch passes through the second switch and then I operate the second switch to interrupt the entire flow of energy.

The first switch normally forms a part of the permanent installation and the second switch normally forms a portable temporary installation which is carried about from place to place as a special portable tool adapted to cut the flow of energy in a line just as a pair of pliers is a portable tool adapted to cut the physical wire of the line.

Figure 1:
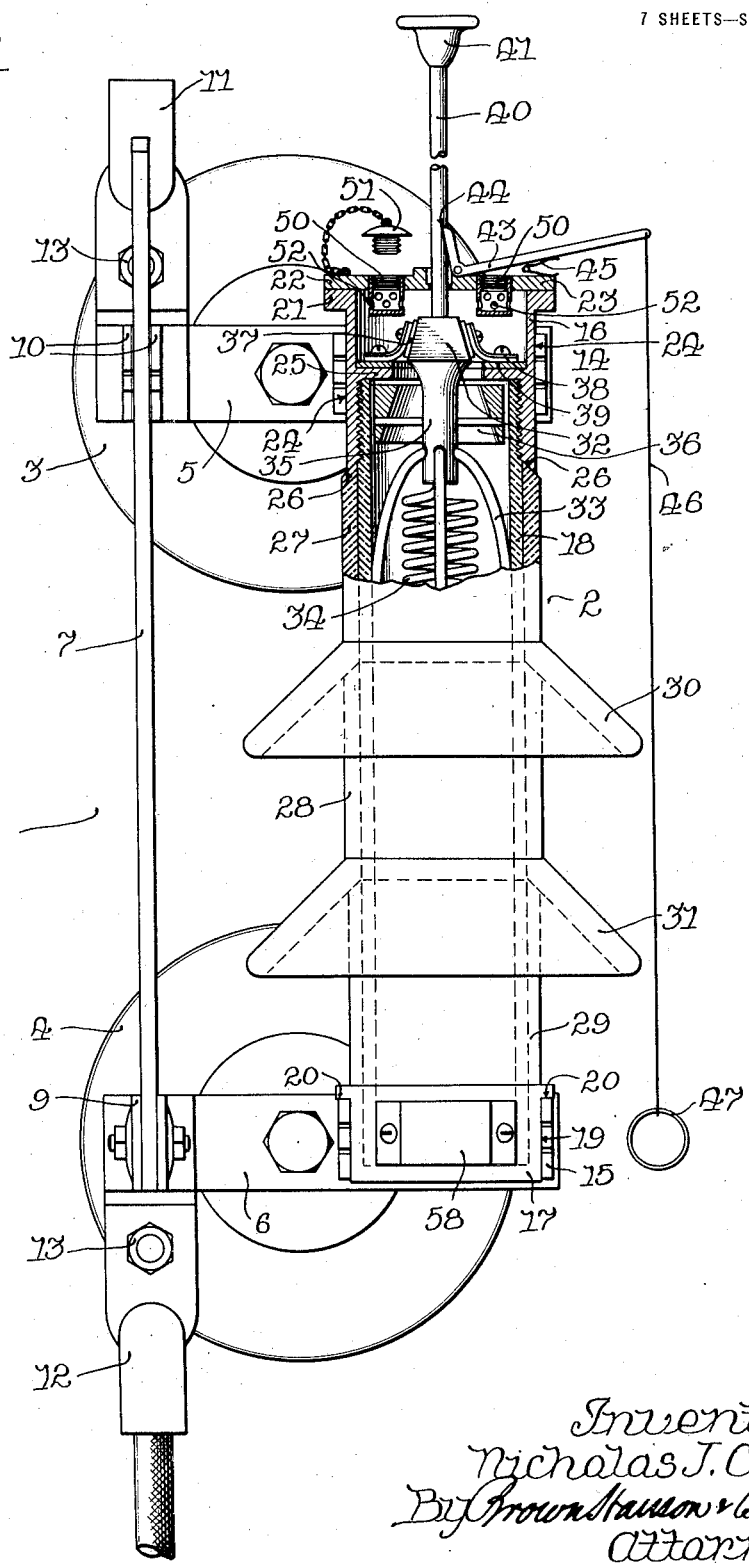

Referring particularly to Figs. 1 and 2, the first switch of relatively small energy interrupting capacity is shown as the disconnecting switch 1 and the second switch of relatively large energy interrupting capacity is shown as a switching unit 2. The disconnecting switch 1 and the switching unit 2 are mounted upon insulators 3, 4 and are connected together by the cross bars or connectors 5 and 6 which are mounted upon the outer ends of the insulators. The disconnecting switch comprises a blade member 7 having an eye 8 at the free end, the other end being pivoted in suitable lugs 9. The spring jaws 10 of the upper contact normally engage the upper end of the blade 7 and complete the circuit between the terminal sockets 11 and 12 to which the line wires are permanently fastened. The socket terminals 11 and 12 are fastened to the cross bars 5 and 6 by suitable bolts 13.

Upon the other ends of the bars 5 and 6 spring clips 14, 15 are mounted. The switching unit 2 has metallic ferrules 16 and 17 forming terminals for the interior working parts of the switching units which ferrules are adapted to co-act with the spring clips 14, 15.

The ferrule 17 is made in the form of a cap for closing the bottom of the sleeve 18 which forms the main casing or frame of the switching unit. The sleeve or tube 18 is made of insulating material, preferably of fiber impregnated with bakelite. The ferrule 17 is provided with splays 19 which form flat engaging surfaces for the spring clip 15, these splays extending up to a point adjacent the upper end of the ferrule to form shoulders 20 which rest upon the upper edge of the spring clip 15 to support the weight of the switching unit.

The ferrule 16 is provided at its upper end with a flange 21 adapted to coöperate with the flange 22 of the head or cover 23. The ferrule 16 is also provided with splays or flat surfaces 24 to provide a larger area of contact with the spring clip 14. The ferrule 16 is provided with an interior flange 25 extending inward from the side walls. Both of the ferrules 16 and 17 are fastened in place by screw threads upon the sleeve 18.

The lower edge of the ferrule 16 is undercut at an angle as shown at 26. This undercut edge is to provide a seat for the upper edge of the petticoated sleeve 27 which fits over the outside of the main sleeve 18. Another petticoated sleeve 28 nests with the sleeve 27 and a plain sleeve 29 forms a spacer between the sleeve 28 and the ferrule 17. The petticoats 30 and 31 increase the creepage and arc-over distance between the ferrules 16, 17.

The operating parts of the switching unit are disposed upon the interior of the main sleeve 18 and comprise a movable switching terminal or member 32 which is connected to the lower ferrule 17 by means of flexible conducting cables 33. A powerful spring 34 is connected between the lower end of the stem 35 and the bottom ferrule 17 and is adapted, when the switch is released, to draw the switch member 32 down into the sleeve 18 which is substantially filled with an arc extinguishing liquid. The arc extinguishing liquid which is employed is preferably carbon-tetrachlorid or other polychlorid derivatives of hydrocarbon as disclosed in co-pending application Serial No. 120,625 filed Sept. 18, 1916. Oil may be used.

The stem 35 of the movable switch element 32 carries a liquid director 36 which is adapted to project a stream of liquid past the end of the switch terminal 32 when the same is drawn downward by the spring 34. The movable switch terminal or member 32 makes contact with a plurality of spring fingers 37 preferably four in number mounted by means of the springs and conductors 38 upon a removable annular ring 39. This removable annular ring 39 is fastened to an annular flange 25.

A rod 40 of insulation is secured to the upper end of the movable switch member 32 and projects out through the head 23. A stuffing box may be provided in the head for the rod 40 although this is generally not necessary. The upper end of the rod 40 is provided with a handle or button 41 to make it easier for the operator to grasp the rod 40 for raising the movable switch member 32 into position to set the switching unit. A detent or trigger 43 engages a catch or notch 44 on the rod 40. The trigger is normally pressed into place by means of the spring 45. A string or operating cable 46 of insulating material is fastened to the outer arm of the trigger 43 for operating the switching unit. A ring or pull handle 47 of any desired type may be provided at the lower end of the operating string or cable 46. The head 23 is provided with openings 50 adapted to be closed by the screw plugs 51 for rendering the device substantially liquid tight. The openings 50 are provided with screens 52 and these openings are adapted to permit emptying or filling of the body of the fuse with liquid and may be left open when the device is to be operated to permit any excess of gas to escape when the arc is extinguished.

The movable switch member 32 is preferably pyramidal in form having flat sides adapted to engage the spring contact fingers 37. Fig. 8 shows the manner in which these spring contact fingers are mounted and shows also the screws 55 by which the annular plate 39 is secured to the annular flange 25 upon the interior of the ferrule 16.

As illustrated in Figs. 1, 2 and 7 the upper and lower ferrules 16 and 17 are provided with bails 57, 58 which are fastened to the ferrules by machine screws as indicated in the drawings.

An operating fork 61 is provided for placing the switching unit 2 in the spring sockets 14 and 15, this operating fork having two finger members 62 and 63 which are adapted to enter the eyes formed by the bails 57 and 58. The fingers 62 and 63 are connected together by a cross piece 64 which is connected to the handle of insulation 65 by means of the adjustable elbow joint 66 (see Figs. 3 and 5). The upper finger or prong 62 is provided with a pin 67 shown in Figs. 3 and 4, this pin being adapted to enter the eye 8 upon the upper end of the switch blade 7 for opening the said switch blade when the device is operated.

The operation of the device thus far described is as follows. The terminal sockets 11 and 12 are permanently connected to the line wires and the switch blade 7 is normally closed so that the current normally all flows through the disconnecting switch 1. The spring clips or terminals 14 and 15 are normally vacant and are idle. When it is desired to break the flow of current through the main line the portable switching unit 2 is put in place by means of the operating fork 61 by slipping the prongs 62, 63 under the bails 57, 58, then pushing the switching unit into the empty sockets 14 and 15 and thereafter withdrawing the fork in order to use it to open the switch blade 7. This is done by placing the pin 67 in the eye 8 and jerking outward to disengage the switch blade from the spring jaws 10. When the switching unit is first put in place, part of the current which normally flows through the switch blade 7 is diverted and flows through the switching unit 2 in proportion to the law of flow of current in divided circuits. When the switch blade 7 is open the entire current is through the switching unit 2, the switching unit being in the position shown in Fig. 1. The trigger 43 is then operated either by pulling on the string 46, or by operating the trigger with the operating fork 61. When the trigger 43 is released the spring 34 draws the movable switching terminal 32 down into the arc extinguishing liquid quickly and effectively interrupting the flow of current. The switching unit is then removed by means of the operating fork 61.

In preparing the switching unit 2 for operation the unit may be carried about filled with liquid if so desired. In that case the plugs 51 are fastened over the vent openings 52 so that the unit may be handled conveniently. If desired the unit may be carried about in the empty condition together with a can or carboy of arc-extinguishing liquid, the unit being filled with liquid just prior to its use. After use the liquid is preferably poured out and cooled in order to prepare the unit for another operation. The screens 52 for the openings 50 in the head 23 are imperforate at the bottom and thus form baffles for preventing the direct passage of liquid out through said openings.

In Fig. 6 I have shown a different form of holding and releasing means from that shown in Figs. 1 to 5 inclusive. In this case it is desired to make the switching unit 2 completely inclosed so that the same may be stored and transported without danger of losing any of the arc extinguishing liquid. To this end the ferrule 16 is covered by a head 70 clamped by means of suitable bolts 71 and flanges 72 to the ferrule to form a closure.

A soft metal gasket 170 is disposed between the head 70 and the top of the ferrule 16. The surfaces of either or both parts which engage the gasket 170 may be provided with ridges or corrugations to insure a satisfactory joint. This head 70 has a central aperture closed by a flexible diaphragm 73.

The diaphragm 73 has its edges soldered in such manner as to permit the disk to be torn loose or blown off in case of excessive pressure within the inclosure.

The movable switch member 32 is provided with a short stem 74 having a notch or detent member adapted to be held by the catch 76. The catch 76 is pivoted at 77 and has a tail 78 which is adapted to be controlled by the trigger 79. The trigger 79 is pivoted at 80 and has its free end directly underlying the center of the diaphragm 73. A striking hammer 81 having a head 82 arranged to strike the diaphragm just over the trigger 79 forms the tripping means for operating the switching unit. It is apparent that the member 79 may be dispensed with and the hammer 82 may engage the tail of the catch 76 if so desired. In case the movable switch element 32 is arranged axially the tail 78 would lie off to one side of the center of the diaphragm. I therefore employ the member 79 to extend the trigger element or mechanism to the center of the diaphragm so that a blow delivered upon the center of the diaphragm will invariably release the device.

The hammer 81 is pivoted at 84 upon a suitable lug 85 attached to the ferrule 16. A spring 86 normally holds the hammer away from the diaphragm. The hammer 81 is arranged somewhat in the shape of a bell-crank with the operating string or cable 46 fastened to the shorter arm so that a quick sharp blow is delivered to the trigger mechanism. The other structural features of this device are substantially the same as those described in connection with Figs. 1 to 5, inclusive.

In Fig. 9 I have illustrated a switching unit of the same general type heretofore described employing a tripping coil for releasing the movable switch element. Instead of employing a single ferrule at the upper end of the casing or sleeve 18, I provide a main ferrule 88 at the top of the casing and an auxiliary ferrule 89 a short distance below the upper ferrule. The upper ferrule 88 is closed off by a cap 90 secured by suitable flanges 91 to render the same liquid tight. The ferrule 89 is connected to an interior ring 92 having an inwardly extending web 93 which has connected thereto a removable ring 39 of substantially the construction shown in Figs. 1 and 8. The removable ring 39 has spring fingers 37 as previously described forming a stationary switch element. The movable switch element 32 coöperates with said fingers all as previously described. The inner and outer rings 89 and 92 are connected together by means of screws 94.

An operating solenoid 95 is mounted upon the ferrules 88 and 89 and has its ends connected to said ferrules. This solenoid is provided with a core 96 connected to the trigger 43, which engages a notch or detent 44 in the rod of insulation 40. This rod of insulation 40 is connected to the movable switch member 32 and extends out through the head 90 to the exterior of the device. The operating string or cable 46, 47 may be connected to the solenoid core 96 or it may be connected to the trigger arm 43.

This form of switching unit has obvious advantages in that it may be left in the circuit and be tripped out whenever an overload occurs in the circuit.

In Figs. 10 and 11 I have illustrated the manner of applying my invention to use in connection with lead covered cables such as are commonly employed under ground. In this case a box 98 commonly termed a subway box is arranged to contain the disconnecting switch 99 and the switching unit 100. The subway box 98 is provided with a removable cover 101 which is normally clamped in place by means of the bolts and wing nuts 102 to form a water tight closure. Wiping nipples 103 and 104 are provided and are adapted to be united by a wiped solder joint to the lead sheath of the cable which is introduced through the short nipples 105 and 106 and the ends fastened to the terminal sockets 11 and 12. The nipples 103, 105 and 104, 106 are fastened together by threaded collars 107 and 108 to form unions.

The cross pieces 5 and 6 to which the terminal sockets 11 and 12 are fastened are mounted upon suitable insulators 110 and 111. The blade of the disconnect switch 99 is provided with a threaded socket 112 to provide attachment for a threaded handle of insulation for opening the switch. The blade is pivoted in a slot 113 on the lug 114 and is adapted to be entirely removed when the switch is opened.

The ferrules 16, 17 are provided with lugs extending rearwardly a sufficient distance to make contact with the clips 14, 15 and to permit the setting rod 40 to lie outside of the edge of the box 98.

Fig. 12 illustrates the manner of applying my invention to overhead cables in connection with a disconnecting pothead 117. This pothead comprises a relatively stationary member 118 and a movable member 119 having coöperating contact members 120 and 121, respectively. The outer part of these potheads is made of insulation as is well known by those skilled in the art. The pothead is fastened by means of a clamp 122 to a cross arm 123 or other suitable support.

Each of the members 118 and 119 is provided with an auxiliary contact member. The movable member 119 has an auxiliary contact member 124 adapted to be engaged by a coöperating member 126 to connect the line cabde 127 with the disconnecting cable 128 which leads to the switching unit 129. In a similar manner the contact 125 is adapted to coöperate with a contact member 130 which thus places the line cable 131 in connection with the disconnecting cable 132 which also leads to the switching unit 129. This switching unit 129 is provided with a suitable clamp 133 to adapt it to be mounted upon a cross-arm 134 or a suitable support.

Normally the contacts 124 and 125 are covered by dummy caps to protect them against the weather.

In operation this device is substantially the same as that shown in the preferred form of Fig. 1. The dummy caps are removed from the contacts 124 and 125, the movable terminals 126 and 130 are then connected to put the switching unit 129 across the contacts 119 and 118, this switching unit being in the set or closed position. The movable member 119 together with the members 124, 126 is then removed from connection with the stationary member 118 except to the switching unit 129. When the parts have thus been separated so that the current is all flowing through the switching unit 129, the switching unit is tripped to operate and stops the flow of current.

In Fig. 13 a somewhat similar embodiment is shown for use in connection with a disconnecting pothead. As shown in this figure, the pothead comprises a movable member 135 and a relatively stationary member 136 connected to the line cables 137 and 138, respectively. Taps such as shown at 139 and 140 are then led to a pothead member 141 which contains suitable terminals for connecting the pothead member 142 across the pothead members 135, 136. Normally the stationary pothead member 141 is covered by a dummy cap 143. When it is desired to disconnect the line 137, 138 the dummy cap 143 is removed and the pothead member 142 is connected to the pothead member 141. The pothead member 142 contains suitable contacts for the cables 144 and 145 which lead to the terminals of the switching unit 150.

When it is desired to disconnect the pothead 135, 136, the cap 143 is removed, the member 142 is connected to the member 141 and the switching unit 150 in closed or set position is thus connected across the potheads 135, 136, current then flowing in parallel through the potheads 135, 136, and switching unit 150. The members 135, 136 are then disconnected so that the entire flow of current passes through the switching unit 150 and then the switching unit is tripped to break the current. The construction of the switching unit 150 may be of any form desired but is preferably of the form shown in Fig. 1 of these drawings.

Figure 14:
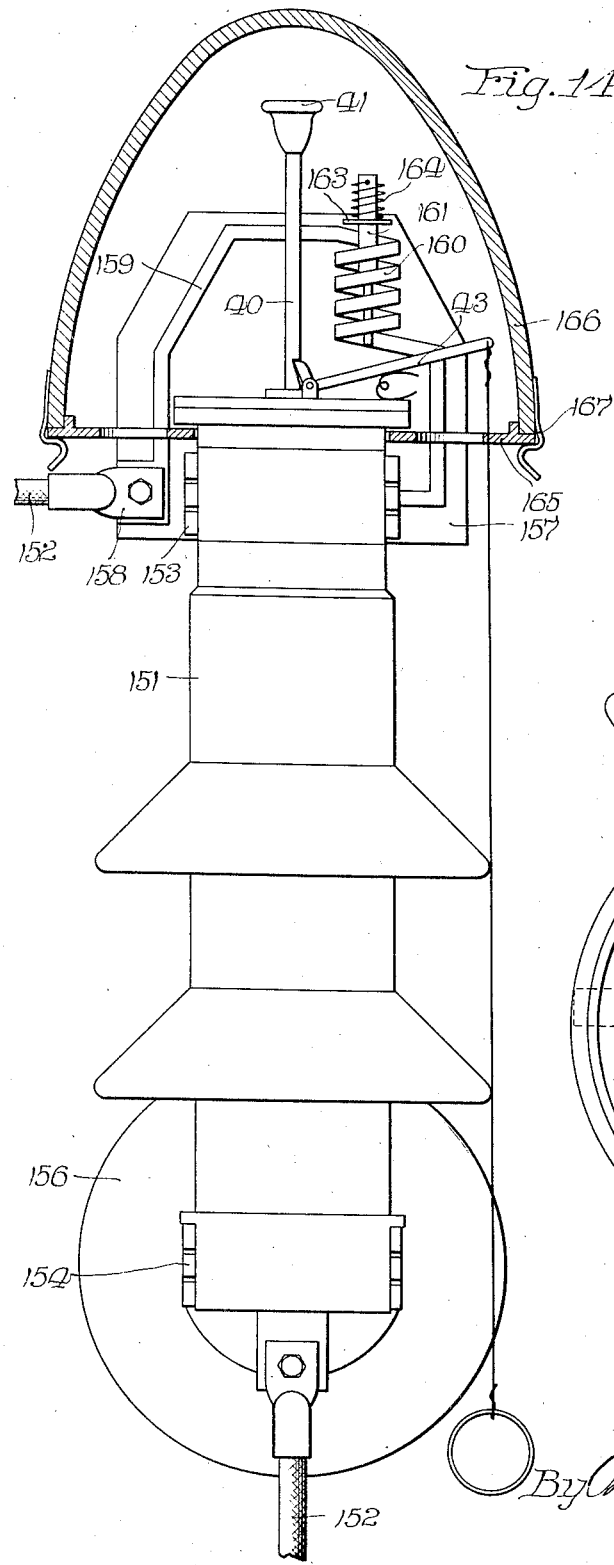
Fig. 14 is a front elevation partly in section showing a construction for employing the switching unit as a permanent circuit breaker in the line.
Figure 15:
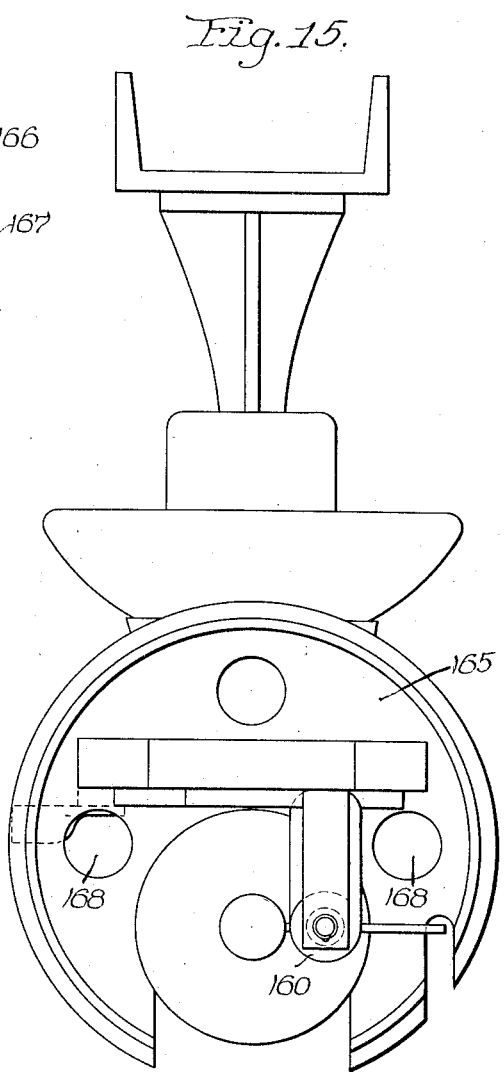
Fig. 15 is a top plan view of the same with the cap removed.

In Figs. 14 and 15 I have illustrated an installation employing the switching unit as a standard part of the line equipment serving as an automatic or manual circuit breaker. This switching unit is a permanent part of the line but is arranged to be readily removable for resetting or for substitution.

The switching unit 151 is of the particular structure illustrated in Fig. 1. It is included directly in series in the line 152 by means of the mounting clips 153, 154. Clip 154 is mounted directly upon the insulator 155 and clip 156 is mounted upon a slab of insulating material 157 preferably of slate or marble. The slab 157 is supported upon a similar insulator. The line terminal 158 is not attached directly to the mounting clip 155 but is mounted upon the slab 157. The terminal 158 is connected by a conductor 159 preferably a rectangular strip of copper to the mounting clip 153. This conductor includes in series a solenoid coil 160 which has a movable plunger 161 adapted when the solenoid is sufficiently energized to engage the trigger 43 to trip the operating parts of the switching unit and thus cause opening of the circuit.

The plunger 161 is guided as by means of the bracket 163 on the slab 157 or other suitable means and is provided with a suitable spring 164 for normally holding the plunger raised. This spring serves also as a graduating spring for determining the current strength at which the device shall be operated. For higher ratings a stiffer spring is used. The upper end of the switching unit 151 and the solenoid 160 are inclosed by a casing formed of the base 165 and the cap 166 which is held by spring clips 167 removably upon the base 165. The cap 166 is imperforated but the base 165 is preferably provided with ventilating openings 168 and a suitable slot 169 through which the switching unit is put in place in the mounting clip. The operation of the device is apparent from the above description.

It can be seen that the cost of the device above explained as a means for breaking current flow is far below that of an oil switch of corresponding capacity. The simplicity of construction and of operation is also marked. The adaptability of the structure is apparent from the different uses above described, although I do not intend to be limited to only the forms or uses that I have illustrated and described.

I do not intend to be limited in the practice of that feature of my invention which relates to the broad idea of switching to any particular type of switch either for the switch which is normally in the line or for the special switch which finally breaks the current, as it is apparent that the advantages of my invention can be secured no matter what the particular form of the switches and connecting apparatus so long as the second switch is of greater energy interrupting capacity than the first switch. It is desirable that the resistance of the switching unit be low so that a large or major portion of the current is diverted through the same when both switches are connected in parallel. It is necessary that the carrying and interrupting capacity of the switching unit be large. It is also apparent that the particular form in which I embody the second switch is highly advantageous and has required inventive thought to produce. I wish it to be understood that the details of construction may be widely varied without departing from the invention.

I claim:

1. In combination, a pair of insulators, a metallic connecting base mounted upon each insulator, permanent line terminals connected to said metallic connecting bases, a disconnecting switch normally connected across said connecting bases to close the normal line circuit, spring jaws on each connecting base and in electric connection therewith and a switching unit of greater interrupting capacity than said disconnecting switch adapted to be connected across said connecting bases, said switching unit having terminal portions for coöperation with said spring jaws.

2. In combination, a cylinder of insulation having an open ferrule at one end, a closed ferrule at the other end, an arc extinguishing fluid in said cylinder, relatively stationary switch contacts secured to the inner wall of the ferrule of the open end, a movable switch element adapted to engage said stationary contact, spring means within said cylinder for withdrawing the movable element away from the stationary element, a catch extending from said movable element and a trigger normally holding said catch to maintain the switch members in contact.

3. In combination, a shell of insulation, an open ended ferrule mounted on the upper end of said shell, relatively stationary contacts secured to said ferrule, a movable contact, means for withdrawing the movable contact from the relatively stationary contacts, a trigger normally holding the switch in closed position, a body of insulating fluid in said casing and a cap for the end of said ferrule.

4. In combination, a casing of insulation having metallic terminal means closing one end thereof, a terminal member on the opposite end of said casing, relatively movable and stationary switch contacts within said casing and in electrical connection with said terminals, a spring for separating said contacts, a body of arc extinguishing liquid, detent means for holding the switch in closed position, a trigger for releasing said detent means, and means carried by the movable switch contact for projecting said arc extinguishing liquid upon the arcing contact upon separation of said contacts.

5. In combination, a cylindrical shell of insulation, an open ferrule at one end, a closed ferrule at the other end, an inwardly extending flange, stationary contacts removably mounted on said flange, a movable contact adapted to engage said stationary contacts, a spring connected between said movable contacts and said other ferrule, a cap for said open ferrule, means for moving the movable contact into engagement with the stationary contact, said means having a detent, and a trigger adapted to engage the detent.

6. In combination, a cylindrical shell of insulation, metallic ferrules at each end of said shell, metallic bails on each of said ferrules, and an independent switch operating member adapted for temporary engagement with said metallic bails to manipulate the device, said switch operating device being portable and normally disengaged from said metallic bails.

7. In combination, a ferrule having an open top, a flange extending inwardly from the inside of said ferrule, an annular plate adapted to lie on top of said flange and be removably secured thereto and spring fingers extending from said ring, and a movable switch member having sloping sides adapted to engage said spring fingers.

8. In combination, a high tension line, an air break switch permanently connected in the line and a portable liquid quenched switch in parallel with the air break switch and temporarily connected to the line.

9. In combination, a cylindrical body of insulation, a metallic ferrule on the upper end, a petticoated sleeve on said cylinder of insulation, a ferrule on the lower end of the cylinder of insulation and a sleeve between the lower ferrule and said petticoated sleeve adapted to hold said petticoated sleeve in position.

10. A liquid quenched switch comprising a containing casing of insulation, terminals on said casing, movable and stationary switching elements in said casing, detent means mounted on one of said terminals for holding the movable switch elements in contact with the stationary switch element and manual means for releasing said movable switch element.

11. In combination a casing of insulation having metallic terminals thereupon, stationary and movable switch contacts in said casing, means mounted on one of the terminals for holding the movable switch element in contact with the stationary switch element, a diaphragm on said terminal element, said diaphragm being so situated with respect to said holding element as to permit the release of the same by a blow upon the diaphragm.

12. The method of breaking the flow of current, having great energy, in a line, which method consists in connecting a switching unit adapted to be automatically opened by the current flow in the line, in parallel with a part of the circuit which carries said flow of current, thereby diverting a part of the current flow only through said switching unit and then opening the line between the parallel connection to cause all of the current flow to pass through the switching unit to automatically open the same thereby breaking the entire current flow.

13. The method of switching current flow of great energy which normally flows through a switch of low interrupting capacity which consists in, first, diverting a part of the current flow to a greater interrupting capacity switching unit adapted to be automatically operated by the current flow in the line and then operating the switch of less interrupting capacity to cause all of the current to flow through the switching unit of greater interrupting capacity to operate the same and thereby break the entire flow of current in the line.

14. In combination, a line, a switch permanently connected to the line, said switch being normally closed, terminals connected to the line on each side of said switch, a switching device of relatively greater electrical energy interrupting capacity than said switch connected to said terminal and means for automatically operating said switching device to break the current flow upon operation of said switch of less electrical energy interrupting capacity.

15. In combination, an insulating base, a pair of metallic connecting bases, means for connecting line terminals to said metallic connecting bases, a disconnecting switch normally connected across said connecting bases to close the normal line circuit, spring jaws on each connecting base and in electrical contact therewith and a portable switching unit of greater interrupting capacity than the disconnecting switch, said portable switching unit being adapted to be mounted directly in and supported by said spring jaws to connect said connecting bases by the coöperation of terminal portions carried by the switching unit with said spring jaws.

16. In combination, a line, an air break switch connected permanently to the line, said air brake switch normally carrying the current flowing in said line, terminals connected to the line upon each side of the switch, and a switching unit temporarily connected to said terminals, said switching unit comprising a relatively stationary contact, a relatively movable contact and arc extinguishing means for said contact, and means automatically controlled by the condition of the air brake switch for separating the relatively movable and stationary contacts of said switching device.

17. In combination, a high tension line, an air brake switch permanently connected in the line and a liquid quenched switch in parallel with the air brake switch and automatically opened upon operation of said air brake switch.

18. In combination, a line, a disconnecting switch device adapted to be permanently connected in the line, and a portable container of relatively small diameter and relatively great depth having a liquid quenched switch in parallel with the disconnecting switch and temporarily connected to the line.

19. In combination, a line, a disconnecting switch device adapted to be permanently connected in the line, and a portable container having an arc extinguishing liquid and a movable switch element adapted to be drawn vertically through the liquid for a distance great enough to break the arc, in parallel with the disconnecting switch and temporarily connected to the line.

In witness whereof I hereunto subscribe my name this 22nd day of September, A. D. 1917.

NICHOLAS J. CONRAD.